Nov. 18, 1969  R. A. BILANCIA  3,479,082
ENCLOSED BACK REST COUPLING FOR WALK-OVER SEAT
Filed March 6, 1968  2 Sheets-Sheet 1
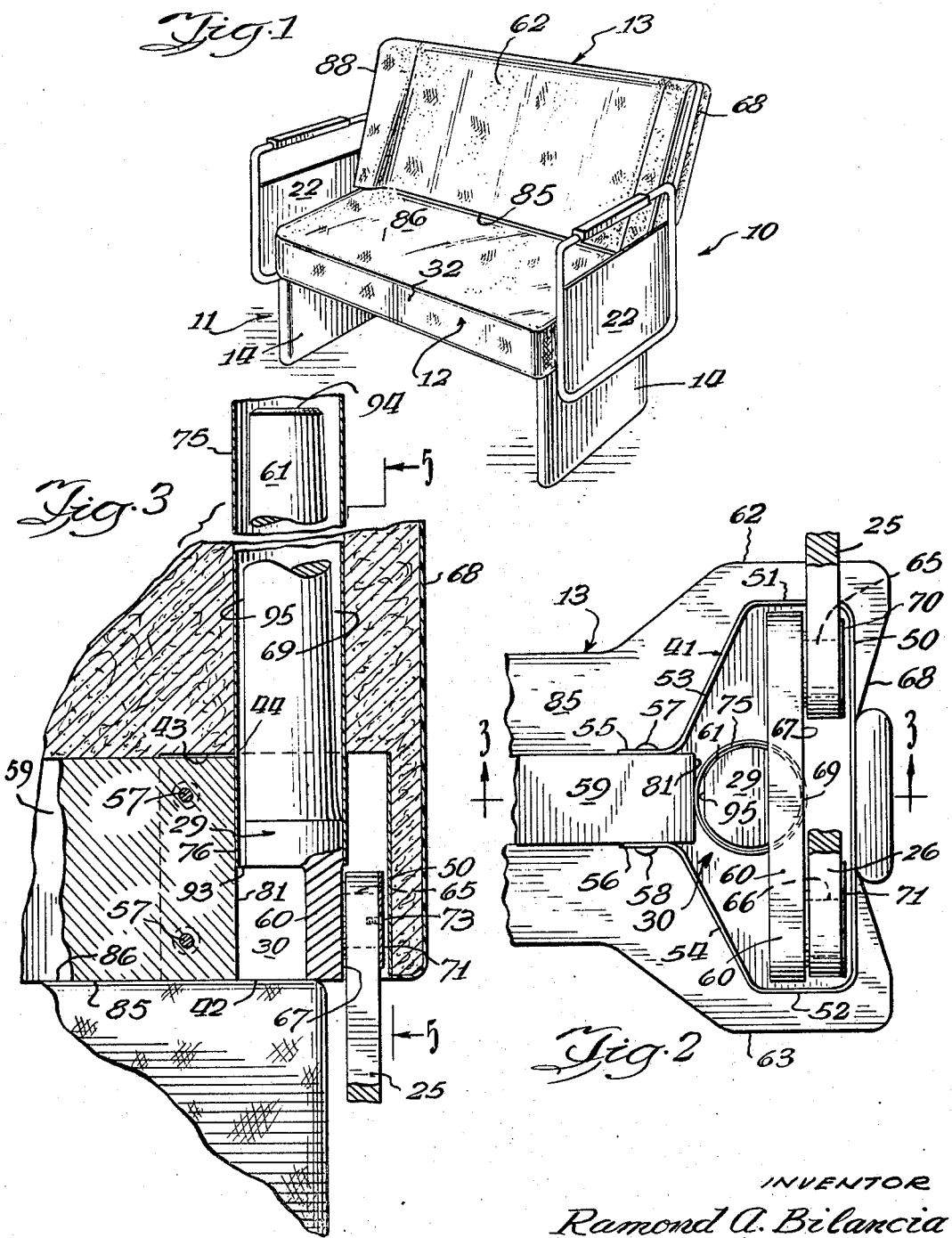

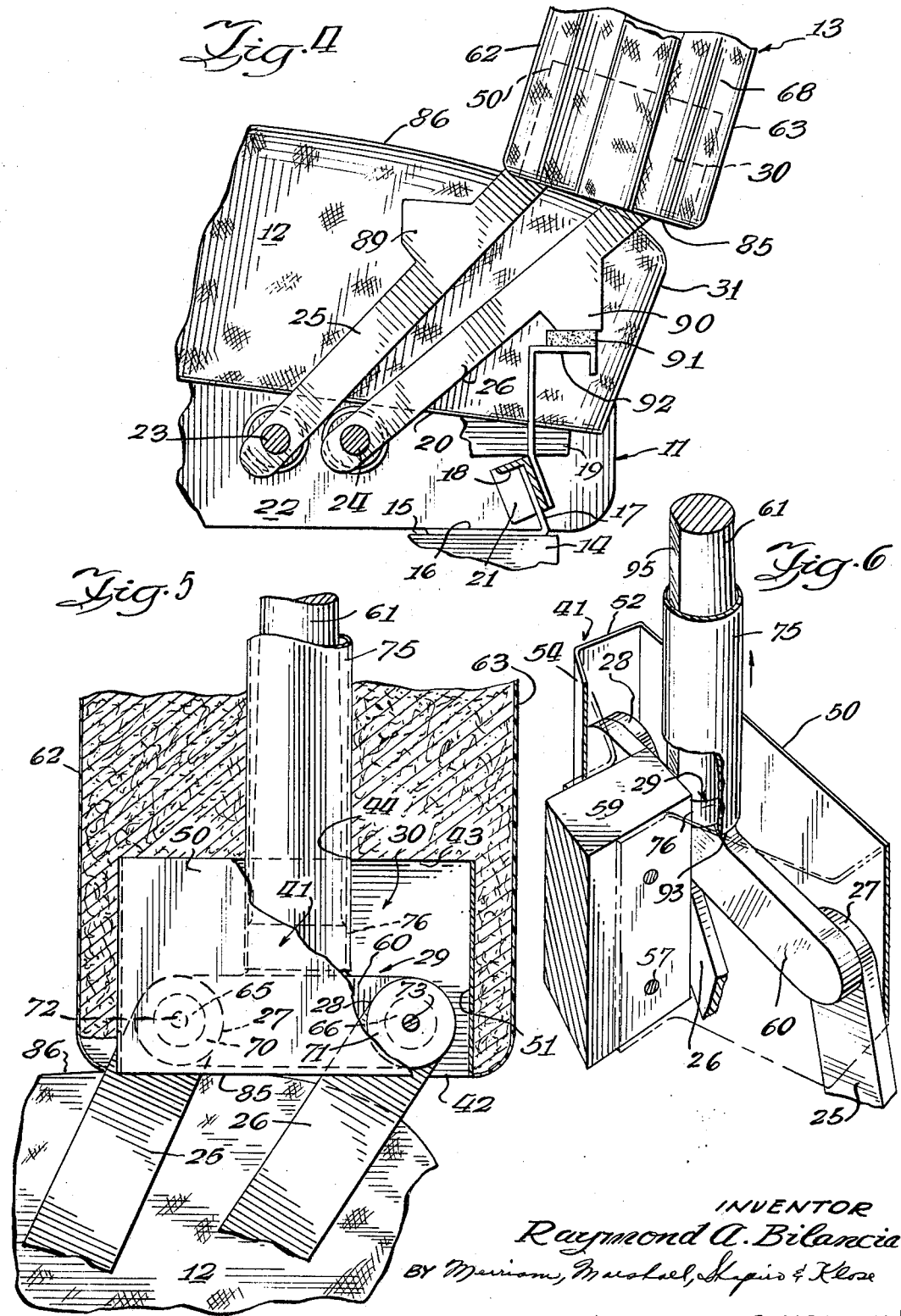

United States Patent Office 3,479,082
Patented Nov. 18, 1969

3,479,082
ENCLOSED BACK REST COUPLING FOR WALK-OVER SEAT
Raymond A. Bilancia, Palatine, Ill., assignor to Coach and Car Equipment Corporation, Elk Grove Village, Ill., a corporation of Illinois
Filed Mar. 6, 1968, Ser. No. 710,928
Int. Cl. B60n 1/06
U.S. Cl. 297—103                                6 Claims

ABSTRACT OF THE DISCLOSURE

Walk-over seat having back rest movable between front end and rear end of seat cushion. Back rest coupled to upper ends of two pairs of levers, one pair extending vertically on each side of seat cushion, with each lever having lower end pivotally connected to seat base. Coupling at upper ends of levers engaging back rest and enclosed entirely within back rest. Back rest has recess at bottom corner into which lever upper ends extend. Coupling has lower portion in recess and upper portion within higher part of back rest. Both coupling portions are substantially vertically aligned with no offsets therebetween. Entire bottom surface of back rest lies in one plane extending from side end to side end of back rest. Bottom surface of back rest abuts top surface of seat cushion when back rest is at either end of seat cushion.

BACKGROUND OF THE INVENTION

The present invention relates generally to a walk-over seat. Walk-over seats are typically used on mass transit vehicles such as subway cars and commuter trains. A walk-over seat is a seat in which the back rest of the seat is mounted for movement, relative to the seat base, from a first supporting position at one end of the seat cushion, across the top of the seat cushion to a second supporting position at the other end of the seat cushion, with the back rest remaining in a substantially vertical disposition throughout the movement.

The movable mounting for the back rest generally comprises two pairs of levers, each pair extending vertically along a respective opposite side of the seat cushion, with each lever having a lower end pivotally connected to the seat base and an upper end pivotally connected to a coupling engaging the back rest.

The couplings are typically located at the bottom corners of the back rest. In conventional walk-over seats, the coupling is exposed to view, which is aesthetically undesirable and can cause discomfort to an occupant of the walk-over seat who is oftentimes seated against the exposed coupling.

With the exposed coupling of conventional walk-over seats, there was normally a gap between the bottom of the back rest and the top of the seat cushion, when the back rest was in either of its supporting positions; or, the lower corners of the back rest were cut away to accommodate the coupling, in which case the middle portion of the bottom of the back rest could be located substantially adjacent the top of the seat cushion. However, in neither case, was the bottom of the back rest in substantial abutment with the top of the seat cushion from one side end to the other side end of the back rest.

The exposed coupling of conventional walk-over seats was a relatively difficult piece to fabricate, requiring a substantial offset between the portion of the coupling connected to the upper ends of the levers and the portion of the coupling which engaged and supported the back rest. A forging was usually required for this part.

SUMMARY OF THE INVENTION

In a walk-over seat constructed in accordance with the present invention, the lower corners of the back rest are provided with a recess having a lower open end at the bottom of the back rest adjacent a side end thereof. Each of the levers extends upwardly through the lower end of the recess and has an upper end located in the recess. The coupling is located entirely within the back rest and has a first portion pivotally connected to the upper ends of the levers, within the recess, and a second portion engaging the back rest within the latter.

The coupling, the pivotal connections thereof to the levers and the upper ends of the levers are all enclosed and hidden from view inside the back rest, thus improving the aesthetic character of the seat.

Moreover, it is not necessary to cut away the lower corners of the back rest to accommodate the coupling. The entire bottom of the back rest, from one side end to the other side end thereof, lies in substantially one plane, and the bottom of the back rest substantially abuts the top of the seat cushion when the back rest is at either end of the seat cushion.

The construction of the coupling is much simpler compared to couplings for conventional walk-over seats. A forging is not required. In a preferred embodiment, the first portion of the coupling is a stamping and the second portion is a rod.

An offset is not required for the coupling: the second portion of the coupling, engaging the back rest, has an outermost surface, facing the nearest side end of the back rest, which lies in substantially the same vertical plane as does the corresponding outermost surface on the first portion of the coupling, pivotally connected to the upper ends of the levers.

Other features and advantages are inherent in the structure claimed and disclosed or will become apparent to those skilled in the art from the detailed description in conjunction with the following diagrammatical drawing.

BRIEF DESCRIPTION OF THE DRAWING

FIGURE 1 is a perspective of a walk-over seat;

FIGURE 2 is a bottom view of the lower corner of the back rest of the walk-over seat, showing a coupling, between the back rest and the mounting levers, constructed in accordance with an embodiment of the present invention;

FIGURE 3 is a sectional view taken along line 3—3 in FIGURE 2;

FIGURE 4 is a fragmentary side view, partially in section, illustrating the manner in which the back rest is pivotally mounted on the base of the walk-over seat;

FIGURE 5 is a sectional view, partially cut away, taken along line 5—5 of FIGURE 3; and FIGURE 6 is a fragmentary perspective, partially cut away, illustrating a coupling constructed in accordance with an embodiment of the present invention.

DETAILED DESCRIPTION OF A PREFERRED EMBODIMENT

Referring initially to FIGURES 1 and 4, there is indicated generally a seat 10 having a base 11 supporting a seat cushion 12. A back rest, indicated generally at 13, is mounted for movement, relative to base 11, between a first position at one end 31 (FIGURE 4) of seat cushion 12 and a second position at an opposite end 32 (FIGURE 1) of the seat cushion with the seat back remaining in a substantially vertically disposed position during the movement.

Referring to FIGURE 4, base 11 includes a pair of legs 14, 14 each having a top surface 15 to which is fixed a strip 16 terminating, at each end of the strip, at a flange 17 extending upwardly and inwardly towards the middle of seat cushion 12. Each flange 17 supports an opposite end of an L-shaped cross member 18 extending from one base leg 14 to the other base leg 14; and resting atop member 18 is an element 19 attached to the bottom 20 of seat cushion 12. Attached to each opposite end of member 18 is a bracket 21 in turn fixed to a side portion 22 of base 11.

The manner in which the seat cushion is supported atop the base is described in greater detail in Bilancia Patent No. 3,265,435.

Referring now to FIGURES 3–5, pivotally connected to each base side portion 22, at 23, 24 respectively, are the lower ends of levers 25, 26 each extending upwardly into a recess 30 located within back rest 13 at a bottom corner thereof. Levers 25, 26 terminate at respective upper ends 27, 28 pivotally connected within recess 30 to a coupling 29. Coupling 29 is located entirely within back rest 13.

As shown in FIGURE 4, levers 27, 28 have respective ear-like portions 89, 90 each for engaging a stop when the back rest is at a respective opposite end of the seat cushion. In FIGURE 4, the back rest is at the rear end 31 of seat cushion 12, and ear 90 on lever 26 engages a pad 91 on a stop 92 attached to cross member 18.

Referring now to FIGURES 2, 3, 5 and 6, the sides of recess 30 are defined in part by a side wall member 41; and the recess has a lower open end 42 and an upper end 43 having an opening 44 receiving a tubular frame member 75 extending upwardly within back rest 13 from opening 44. Recess 30 has a relatively small vertical dimension compared to the vertical dimension of the tubular member above opening 44.

Side wall member 41 includes an outer side wall 50, front and back side walls 51, 52 respectively, inner side walls 53, 54 and innermost terminal portions 55, 56 respectively fastened at 57, 58 to a horizontally extending frame member 59 located at the bottom of back rest 13 and having an outer end surface 81 forming the innermost side wall of recess 30. Side wall member 41 has an open top and an open bottom.

Coupling 29 includes a strip-like first portion 60 located entirely within recess 30 and extending between the front and rear surfaces 62, 63 resceptively of back rest 13. Coupling first portion 60 is integral with a rod-like second coupling portion 61 extending upwardly within tubular frame member 75 for engagement with back rest 13. Coupling first portion 60 may be a stamping welded to the bottom of a rod constituting coupling second portion 61.

Extending outwardly from coupling first portion 60 are a pair of pins 65, 66 each respectively pivotally mounting a respective upper lever end 27, 28, the lever upper ends being held in place on pins 65, 66 by cap members 70, 71 through which threaded fasteners 72, 73 engaging pins 65, 66 (FIGURES 3 and 5).

There is no offset on coupling 29 between the first and second portions theerof. As shown in FIGURES 2 and 3, coupling first portion 60 has an outermost surface 67, facing the nearest side end 68 of back rest 13, and surface 67 lies in substantially the same vertical plane as does the corresponding outermost surface 69 on the second coupling portion 61.

Enclosing coupling second portion 61 is tubular member 75 extending downwardly through recess upper opening 44 and into the recess. Tubular member 75 terminates at a lower portion 76 located in recess 30 and resting on coupling first portion 60. Tubular member 75 constitutes part of back rest 13; and, in the illustrated embodiment, back rest 13 may be removed from engagement with coupling 29 merely by raising back rest 13 until the bottom end 93 of tubular member 75 clears the top 94 of coupling second portion 61 (FIGURE 3). Coupling second portion 61 may have a flat innermost surface 95.

Referring to FIGURES 1, 4 and 5, the back rest 13 has a bottom surface 85, the totality of which, from one side end 68 of the back rest to the other side end 88, lies in substantially one plane; and back rest bottom surface 85 substantially abuts top surface 86 of seat cushion 12 when the back rest is in either of its two supporting positions adjacent either rear end 31 or front end 32 of seat cushion 12.

The foregoing detailed description has been given for clearness of understanding only, and no unnecessary limitations should be understood therefrom, as modifications will be obvious to those skilled in the art.

What is claimed is:

1. In a walk-over seat:
a base;
a back rest having a pair of opposite side ends and a bottom;
means defining a recess in the back rest;
said recess having a lower open end at the bottom of the back rest adjacent one side end thereof;
lever means having a lower end portion pivotally connected to said base, said lever means extending upwardly through said lower open end of the recess and having an upper end portion located in said recess;
and coupling means, located entirely within said seat back, connected to the upper end portion of said lever means and coupling said back rest to said lever means for movement of the back rest with said lever means;
said coupling means and the connection thereof to the upper end portion of the lever means being hidden from view inside the back rest.

2. In a walk-over seat as rectied in claim 1:
said recess having an upper end with an opening therein;
a tubular member, in said back rest, extending upwardly within said back rest from said opening in the upper end of the recess;
said recess having a relatively small vertical dimension compared to the vertical dimension of said tubular member above the upper end of the recess;
said coupling means including a first portion located within said recess and connected to the upper end portion of said lever means and a second portion extending upwardly within said tubular member for engagement with said back rest.

3. In a walk-over seat as recited in claim 2 wherein:
the second portion of the coupling means has an outermost surface, facing the nearest side end of the back rest, which lies in substantially the same vertical plane as does the corresponding outermost surface on said first portion of the coupling means.

4. In a walk-over seat as recited in claim 2:
said tubular member extending downwardly through the opening in the upper end of said recess and terminating at a lower end portion located in said recess.

5. In a walk-over seat as recited in claim 1 wherein:
said means defining said recess comprises a member having an outer wall, front and back walls, inner wall means, and means for attachment to the interior of said back rest;
said recess member having an open top and an open bottom.

6. In a walk-over seat as recited in claim 1:
the entire bottom of said back rest, from one side end to the other side end, lying in substantially one plane;
a seat cushion supported on said base;
said seat cushion having a top surface and front and rear ends;
means, including said pivotal lever means and said coupling means, mounting the back rest for movement between a first position at one end of the seat cushion and a second position at the other end of the seat cushion;
the bottom of said back rest substantially abutting said top of the seat cushion when the back rest is in either of said first and second position thereof.

References Cited

UNITED STATES PATENTS

| | | | |
|---|---|---|---|
| 1,196,908 | 9/1916 | Walker | 297—103 X |
| 1,364,756 | 1/1921 | Henry | 297—103 |
| 1,968,434 | 7/1934 | Bell | 297—103 |
| 3,313,570 | 4/1967 | McVeigh | 297—103 |

JAMES T. McCALL, Primary Examiner

U.S. Cl. X.R.

297—94